J. W. APPLIN.
CURTAIN COMPARTMENT FOR AUTOMOBILES.
APPLICATION FILED DEC. 13, 1919.
1,351,547.  Patented Aug. 31, 1920.
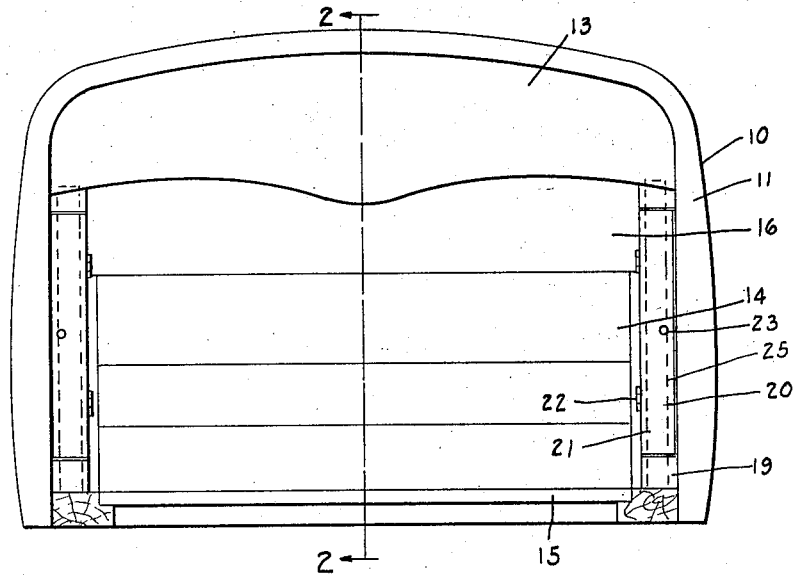
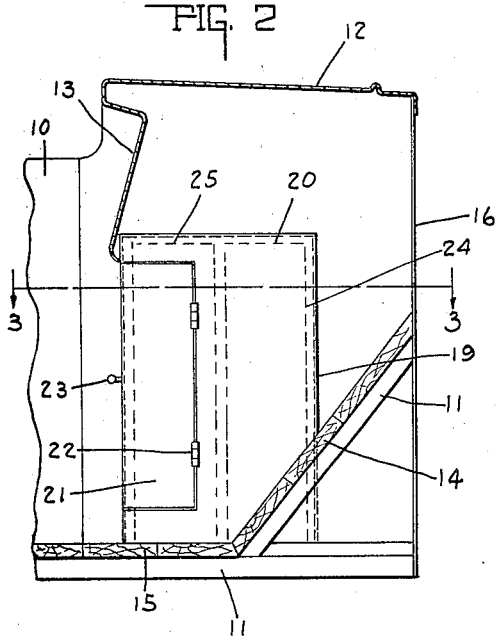
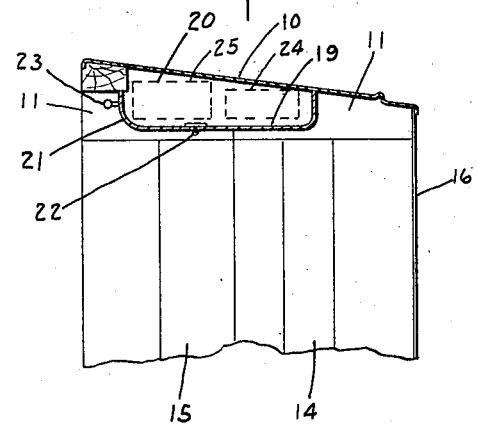
INVENTOR.
JOHN W. APPLIN.
BY
Lockwood & Lockwood
ATTORNEYS.

UNITED STATES PATENT OFFICE.

JOHN W. APPLIN, OF INDIANAPOLIS, INDIANA, ASSIGNOR TO LA FAYETTE MOTORS COMPANY, A CORPORATION OF DELAWARE.

CURTAIN COMPARTMENT FOR AUTOMOBILES.

1,351,547.  Specification of Letters Patent.  Patented Aug. 31, 1920.

Application filed December 13, 1919. Serial No. 344,693.

*To all whom it may concern:*

Be it known that I, JOHN W. APPLIN, a citizen of the United States, and a resident of Indianapolis, county of Marion, and State of Indiana, have invented a certain new and useful Curtain-Compartment for Automobiles; and I do hereby declare that the following is a full, clear, and exact description thereof, reference being had to the accompanying drawings, in which like numerals refer to like parts.

This invention relates to a curtain compartment for a motor vehicle in which the side curtains therefor may be folded up longitudinally and conveniently stored when not in use. Heretofore, various methods of disposing of side curtains of an automobile when not in use have been resorted to, usually by storing them in a hammock arrangement upon the vehicle top, or placing them in a compartment under the seat, or stowing them in compartments otherwise positioned about the car. These two more common methods are inconvenient, and it is the purpose of this invention to so construct the vehicle body as to provide a more convenient place for storing the curtains, whereby they will be readily accessible to the driver of the automobile without necessitating the driver's climbing upon the seats or getting under them, or otherwise disarranging the car, or getting out of the same. The car body is constructed so that the cowl portion, which is the portion most accessible to the driver, is utilized in a novel manner to provide a convenient curtain compartment without interfering with the instrument board associated with the cowl, or the usual car controlling means positioned adjacent thereto, and without discomforting the driver of the car or the passenger in the front seat thereof.

The full nature of this invention will be more fully understood from the accompanying drawings and the following description and claims.

Referring to the drawings Figure 1 is a cross section taken through the driver's compartment and looking forward toward the cowl, the instrument board and the foot board. Fig. 2 is a cross section taken on the line 2—2 of Fig. 1. Fig. 3 is a cross section taken on the line 3—3 of Fig. 2.

In the drawings there is shown a section cut through the sheet metal body 10 which is supported upon a wooden frame 11, the sheet metal body forming a cowl 12. Secured across the front of the vehicle, and depending from the cowl there is the usual instrument board 13, and mounted in the frame 11 there is the foot board 14, floor 15 and dash 16. In the ordinary construction of a motor vehicle, the space is not used between the front doors of the vehicle and the dash, as the upwardly and diagonally extending foot board 14 generally so reduces the space as to make it useless. By means of this invention a portion of this wasted space may be utilized without discomforting the driver or the passenger in the front seat by mounting an inclosing wall 19 on each side of the driver's compartment between the forward door frame and the dash board. The wall 19 incloses a curtain compartment 20 and extends from a height approximate to the lower edge of the instrument board to the floor 15 and through the upwardly and diagonally extending foot board 14, as shown in Fig. 2. The inclosing wall 19 may be formed of leather upholstering or trimming mounted on the wooden frame member, but preferably, as shown herein, by a sheet metal box made for the purpose to fit against the inner surface of the cowl supporting body frame 11. The rear portion of the inclosure is provided with a door 21, spring hinged to the inclosing wall by the spring hinges 22, which will cause it to clamp shut and remain closed under spring tension, a handle 23 being provided to open the door.

The compartment 20 is so proportioned and arranged that the curtains 24 and 25 may be folded longitudinally in the usual manner and inserted upright through the opening closed by the door and deposited in their proper positions in the compartment as indicated in dotted lines. They, then, when necessary or desired, will be readily accessible to the driver by opening the door 21, and when not necessary or desired may be inclosed and stored away by simply inserting them and releasing the door which is spring closed.

This arrangement permits curtains, and especially those which are provided with narrow elongated windows to be folded parallel to said windows and inserted upright in the vertical compartments. In addition to the foregoing, positioning the compartments at either side of the cowl supporting frame, utilizes space ordinarily wasted, and which at the same time, is readily accessible to the driver of the car without requiring the climbing over seats, the removal of seats, or otherwise leaving the driver's space, or even the car itself, as heretofore has been necessary. While compartments have been provided in the driver's space, and even in some instances in the cowl itself, these compartments when not positioned upon the cowl have been too small for curtain storage purposes, and when large enough to receive curtains and also associated with the cowl, said compartments have interfered with the driver and have caused discomfort to the driver and the passenger of the front seat by occupying space required by the same, since the lower edge of the instrument board is correspondingly lowered to provide efficient room for the curtain compartment.

The invention claimed is:

1. In combination with the driver's space of a motor vehicle having a floor, a foot board extending forwardly of and upwardly from said floor, and a cowl forming the sides and top of said space, of a vertical compartment mounted in a side of said space, said compartment extending forwardly from the floor and below the upwardly extending surface of said foot board for inclosing a space adapted to receive curtains, and a door for said compartment and opening into the driver's space for permitting curtains to be inserted therein, said door being positioned between the upwardly extending footboard and the compartment portion nearest the driver's seat.

2. In combination with the driver's space of a motor vehicle having a floor, a foot board extending forwardly of and upwardly from said floor, and a cowl forming the sides and top of said space, of a vertical compartment mounted in a side thereof, including an inclosing wall extending forwardly from the floor and below the upwardly extending surface of said foot board for inclosing a space adapted to receive curtains, and a door hinged on the wall of said compartment and opening into the driver's space for permitting curtains to be inserted therein.

3. In combination with the driver's space of a motor vehicle having a floor, a foot board extending forwardly of and upwardly from said floor, and a cowl forming the sides and top of said space, of a curtain compartment mounted in a side of said space, including an inclosing wall extending forwardly from the floor and below the upwardly extending surface of said foot board for inclosing a space adapted to receive curtains, and a door spring-hinged on the wall of said compartment and opening into the driver's space for permitting the curtains to be inserted therein, whereby said door will close under spring tension when released.

4. A curtain compartment for motor vehicles, including a casing arranged to inclose a space when mounted adjacent the inner surface of the cowl supporting side of said vehicle in which curtains may be stored, said casing extending to the floor of said vehicle and forwardly through the foot board thereof, and a door forming a part of the wall of said casing and hinged thereto and opening into the driver's space for permitting curtains to be inserted and inclosed therein.

5. The combination with a motor vehicle having a driver's space in the forward portion thereof, a floor, a foot board, and a cowl, of a compartment within and at each side of the driver's space and adjacent said cowl, said compartment extending through said foot board for containing the curtains for said vehicle when the same are not in use, and doors mounted in said compartments and opening into the driver's space for permitting the insertion and withdrawal of the curtains therefrom.

In witness whereof, I have hereunto affixed my signature.

JOHN W. APPLIN.